United States Patent
Devarakonda

(10) Patent No.: US 9,228,469 B2
(45) Date of Patent: Jan. 5, 2016

(54) EXHAUST AFTERTREATEMENT SYSTEM WITH CATALYTIC DEACTIVATION MONITORING

(71) Applicant: GENERAL ELECTRIC COMPANY, Schenectady, NY (US)

(72) Inventor: Maruthi Narasinga Rao Devarakonda, Waukesha, WI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/252,890

(22) Filed: Apr. 15, 2014

(65) Prior Publication Data
US 2015/0292384 A1    Oct. 15, 2015

(51) Int. Cl.
*F01N 3/00* (2006.01)
*F01N 3/20* (2006.01)

(52) U.S. Cl.
CPC ........................ *F01N 3/208* (2013.01)

(58) Field of Classification Search
CPC ............................................................. F01N 3/208
USPC ........................................................... 60/286
See application file for complete search history.

(56) References Cited

U.S. PATENT DOCUMENTS

| | | | |
|---|---|---|---|
| 6,047,542 A * | 4/2000 | Kinugasa et al. | 60/274 |
| 2009/0158710 A1 | 6/2009 | Suzuki | |
| 2010/0024390 A1 * | 2/2010 | Wills et al. | 60/274 |
| 2010/0024397 A1 | 2/2010 | Chi et al. | |
| 2010/0236224 A1 * | 9/2010 | Kumar et al. | 60/297 |

FOREIGN PATENT DOCUMENTS

| | | |
|---|---|---|
| EP | 2149684 A1 | 2/2010 |
| EP | 2354485 A1 | 8/2011 |

OTHER PUBLICATIONS

U.S. Appl. No. 14/252,849, filed Apr. 15, 2014, Maruthi Narasinga Rao Devarakonda.
U.S. Appl. No. 14/154,418, filed Jan. 14, 2014, Maruthi N. Devarakonda.
European Search Report for EP Application No. 15163404.5; mailed Aug. 19, 2015.

* cited by examiner

*Primary Examiner* — Jason Shanske
(74) *Attorney, Agent, or Firm* — Fletcher Yoder, P.C.

(57) ABSTRACT

A system includes a controller configured to determine if a combustion engine is operating under a desired rich fuel condition. The controller is also configured, if the combustion engine is operating under the desired rich fuel condition, to monitor a catalytic activity within an ASC assembly that converts $NH_3$ within treated exhaust gases from the combustion engine into $N_2$ to determine whether the catalytic activity has been deactivated in the ASC assembly.

16 Claims, 2 Drawing Sheets

EXHAUST AFTERTREATMENT SYSTEM WITH CATALYTIC DEACTIVATION MONITORING

BACKGROUND

The subject matter disclosed herein relates to an exhaust aftertreatment system for an internal combustion engine and, more specifically, to monitoring a component of the exhaust treatment system for catalytic deactivation.

Engines (e.g., internal combustion engines such as reciprocating engines or gas turbines) combust a mixture of fuel and air to generate combustions gases that apply a driving force to a component of the engine (e.g., to move a piston or drive a turbine). Subsequently, the combustion gases exit the engine as an exhaust, which may be subject to exhaust treatment (e.g., aftertreatment) systems that include one or more catalytic converters (e.g., three-way catalyst (TWC) assembly, ammonia slippage catalyst (ASC) assembly, etc.) to reduce the emissions of nitrogen oxides ($NO_X$), hydrocarbons (HC), and carbon monoxide (CO). However, as some of the catalysts of the catalytic converters age or become deactivated, the effectiveness of the catalysts at reducing emissions may decrease.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes an exhaust aftertreatment system configured to treat emissions from a combustion engine. The exhaust aftertreatment system includes a first catalyst assembly configured to receive a fluid and to convert ammonia ($NH_3$) within the fluid into nitrogen ($N_2$), wherein the first catalyst assembly has an inlet and an outlet. The exhaust aftertreatment system also include at least one oxygen ($O_2$) sensor disposed upstream of the inlet of the first catalyst assembly and configured to determine a concentration of $O_2$ in exhaust gases generated by the combustion engine. The exhaust aftertreatment system further includes at least one $NO_X$ sensor disposed downstream of the outlet of the first catalyst assembly and configured to measure a concentration of $NO_X$ in the fluid exiting the outlet of the first catalyst assembly. The exhaust aftertreatment system yet further includes a controller configured to receive a first signal from the at least one $NO_X$ sensor representative of the concentration of $NO_X$ in the fluid exiting the outlet of the first catalyst assembly and a second signal from the at least one $O_2$ sensor representative of the concentration of $O_2$ in the exhaust gases generated by the combustion engine. The controller is also configured to determine whether the catalytic activity has been deactivated in the first catalyst assembly.

In accordance with a second embodiment, a system includes a controller configured to determine if a combustion engine is operating under a desired rich fuel condition. The controller is also configured, if the combustion engine is operating under the desired rich fuel condition, to monitor a catalytic activity within an ASC assembly that converts $NH_3$ within treated exhaust gases from the combustion engine into $N_2$ to determine whether the catalytic activity has been deactivated in the ASC assembly.

In accordance with a third embodiment, a system includes an exhaust aftertreatment system configured to treat emissions from a combustion engine. The exhaust aftertreatment system includes a TWC assembly having a first inlet. The exhaust aftertreatment system also includes an ASC assembly configured to receive treated exhaust gases from the TWC assembly and to convert $NH_3$ within the treated exhaust gases into $N_2$, wherein the ASC assembly has a second inlet and an outlet. The exhaust aftertreatment system further includes at least $O_2$ sensor disposed upstream of the first inlet of the TWC assembly and configured to determine a concentration of $O_2$ in exhaust gases generated by the combustion engine. The exhaust aftertreatment system yet further includes at least one $NO_X$ sensor disposed downstream of the outlet of the ASC assembly and configured to measure a concentration of $NO_X$ in the treated exhaust gases exiting the outlet of the ASC assembly. The exhaust aftertreatment system still further includes a controller configured to determine if the combustion engine is operating under a desired rich fuel condition, and, if the combustion engine is operating under the desired rich fuel condition, to monitor catalytic activity within the ASC assembly that converts $NH_3$ within the treated exhaust gases into $N_2$ to determine whether the catalytic activity has been deactivated in the ASC assembly.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
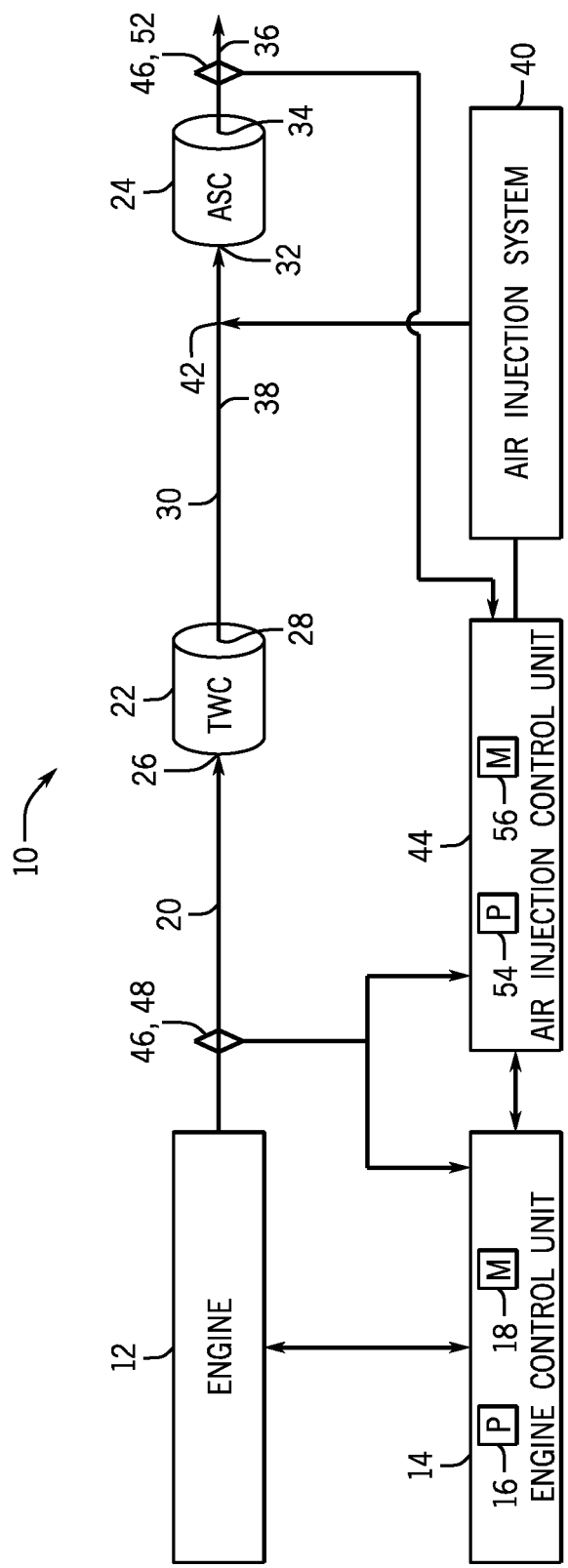
FIG. 1 is a schematic diagram of an embodiment of an exhaust treatment (e.g., aftertreatment) system coupled to an engine.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to computer-implemented systems and methods for monitoring the fuel operating condition (e.g., lean fuel or rich fuel operating condition) of a combustion engine (e.g., reciprocating internal combustion engine or gas turbine engine), monitoring the deactivation (e.g., due to aging, thermal aging, and/or chemical poisoning) of catalysts in catalytic converters, and recommending corrective actions in response to detecting deactivated catalysts. In particular, embodiments of the present disclosures include an exhaust treatment (e.g., aftertreatment) system configured to couple to the combustion engine and to treat emissions (e.g., in the engine exhaust) from the combustion engine (e.g., $NO_X$, HC, CO, etc.). The disclosed embodiments may be used to monitor and control any type of exhaust treatment system, such as catalyst based systems, chemical injection systems, or other types. The exhaust treatment system includes at least a first catalyst assembly (e.g., ASC assembly) that receives a fluid (e.g., treated exhaust flow or gases of the combustion engine) and converts $NH_3$ into molecular nitrogen ($N_2$) and CO into carbon dioxide ($CO_2$) and water. In certain embodiments, the exhaust treatment system includes a second catalyst assembly (e.g., TWC assembly) that initially treats the exhaust gases from the combustion engine prior to the first catalyst assembling receiving them. In certain embodiments, a fluid conduit is disposed between the TWC assembly and the ASC assembly that transfers (e.g., enables flow) of the fluid (e.g., treated exhaust gases) from the second catalyst assembly to the first catalyst assembly. An air or oxidant injection system (e.g., passive mid-bed air injection system) is coupled to the fluid conduit and injects an oxidant (e.g., air, $O_2$, oxygen-enriched air, or oxygen-reduced air) into the fluid conduit to regulate (e.g., maintain) a temperature of the fluid flowing into an inlet of the first catalyst assembly and to regulate catalytic activity in the first catalyst (e.g., conversion of $NH_3$ into $N_2$ and/or conversion of CO into $CO_2$ and water).

Multiple transducers or sensors (e.g., $O_2$ or lambda ($\lambda$) sensors and/or $NO_X$ sensors) may be disposed throughout the exhaust treatment system. For example, at least one $O_2$ sensor is disposed upstream of an inlet of the first catalyst assembly (and upstream of the second catalyst assembly) that determines a concentration of $O_2$ in exhaust gases (e.g., prior to catalytic treatment) generated by the combustion engine. At least one $NO_X$ sensor is disposed downstream of an outlet of the first catalyst assembly that measures an amount (e.g., concentration) of $NO_X$ in the fluid (e.g., treated exhaust gases) exiting the outlet of the first catalyst assembly. A controller (e.g., air injection controller) is coupled to the air injection system. The controller receives signals from the multiple transducers representative of system parameters (e.g., concentration of $O_2$ in exhaust gases generated by the combustion engine and levels of $NO_X$ in the fluid exiting the first catalyst assembly). The controller monitors the catalytic activity in the first catalyst assembly and determines whether the catalyst or catalytic activity in the first catalyst assembly has been deactivated (e.g., decreased in catalytic activity due to aging, thermal aging, and/or chemical poisoning). In certain embodiments, determining whether the catalyst has been deactivated may include determining if an amount or concentration of $NO_X$ in the fluid is greater than a $NO_X$ threshold value. Based on a determination that the catalytic activity in the first catalyst assembly (e.g., ASC assembly) has been deactivated, the controller may recommend a corrective action (e.g., cleaning of the first catalyst assembly). In certain embodiments, prior to determining whether the catalyst has been deactivated in the first catalyst assembly, the controller may determine the fuel operating engine condition of the combustion engine. For example, the controller may determine if the combustion engine is operating under a desired rich fuel condition by determining an air-to-fuel equivalence ratio value (e.g., $\lambda$ value) for the exhaust gases generated by the combustion engine based at least on the concentration of $O_2$ (e.g., received from the at least one $O_2$ sensor) and to compare the air-to-fuel equivalence ratio to a threshold or reference air-to-fuel equivalence ratio value (e.g., $\lambda$ reference) to determine if the air-to fuel equivalence ratio value is less than or equal to the threshold air-fuel equivalence ratio value. By diagnosing catalyst deactivation in the first catalyst assembly, emissions may be reduced and catalytic activity of the first catalyst assembly maximized.

Turning now to the drawings and referring to FIG. 1, a schematic diagram of an exhaust treatment (e.g., after treatment) system 10 coupled to an engine 12 is illustrated. As described in detail below, the disclosed exhaust treatment system 10 monitors a fuel operating condition of the engine 12. If the engine 12 is operating under a desired rich fuel condition (e.g., has an air-to-fuel equivalence value ($\lambda$ value) of less than 1.0 such as approximately 0.999, 0.998, 0.997, 0.996, 0.995, 0.994, 0.993, 0.980, 0.970, 0.960, 0.950, or any other value less than 1.0), the disclosed exhaust treatment system 10 monitors the catalytic activity of a catalyst assembly (e.g., ASC assembly) for deactivation (e.g., decrease in catalytic activity due to aging, thermal aging, and/or chemical poisoning) of the catalysts. Also, the disclosed exhaust treatment system 10, if catalytic deactivation is detected, provides a recommendation for corrective action (e.g., recommendation of cleaning the catalyst assembly). The engine 12 may include an internal combustion engine such as a reciprocating engine (e.g., multi-stroke engine such as two-stroke engine, four-stroke engine, six-stroke engine, etc.) or a gas turbine engine. The engine 12 may operate on a variety fuels (e.g., natural gas, diesel, syngas, gasoline, etc.). The engine 12 may operate as a lean-burn engine or a rich-burn engine. The engine 12 is coupled to an engine control unit (e.g., controller) 14 that controls and monitors the operations of the engine 12. The engine control unit 14 includes processing circuitry (e.g., processor 16) and memory circuitry (e.g., memory 18). The processor 16 may execute instructions to carry out the operation of the engine 12. These instructions may be encoded in programs or code stored in a tangible non-transitory computer-readable medium (e.g., an optical disc, solid state device, chip, firmware) such as the memory 18.

During operation, the engine 12 generates combustion gases 20 used to apply a driving force to a component of the engine 12 (e.g., one or more pistons or turbines). The combustion gases 20 subsequently exit the engine 12 as an exhaust 20, which includes a variety of emissions (e.g., $NO_X$, HC, CO, etc.). The exhaust treatment system 10 treats these emissions to generate milder emissions (carbon dioxide ($CO_2$), water, etc). As depicted, the exhaust treatment system 10 includes catalytic converters or catalysts assemblies such as the TWC assembly 22 and the ASC assembly 24. In embodiments that include the TWC assembly 22 and the ASC assembly 24, the engine 12 may be operated as a rich-burn engine (e.g., has $\lambda$ value of less than 1.0 such as approximately 0.999, 0.998, 0.997, 0.996, 0.995, 0.994, 0.993, 0.980, 0.970, 0.960, 0.950, or any other value less than 1.0) to maximize the catalytic activity in both the TWC assembly 22 and the ASC assembly 24. The TWC assembly 22, via its catalytic activity, reduces $NO_X$ via multiple reactions. For example, $NO_X$ may be reduced via CO to generate $N_2$ and $CO_2$, $NO_X$ may be reduced via $H_2$ to generate $NH_3$ and water, and $NO_X$ may be reduced via a hydrocarbon (e.g., $C_3H_6$) to generate $N_2$, $CO_2$, and water. The TWC 22 assembly also oxidizes CO to $CO_2$, and oxidizes unburnt HC to $CO_2$ and water. A by-product of the reduction of $NO_X$ in the TWC assembly is the emission of $NH_3$ as a result of ammonia slippage (e.g., due to unreacted $NH_3$). In certain embodiments, instead of the TWC assembly 22, any catalytic converter that reduces $NO_X$ may be utilized. The ASC assembly 24, via its catalytic activity (e.g., at zeolite sites), selectively reduces the $NH_3$ to $N_2$. In certain embodiments, the ASC assembly 24 also oxidizes CO to $CO_2$. An unaged (e.g., having complete catalytic activity) catalyst in the ASC assembly 24 generally converts all of the $NH_3$ to $N_2$. The ASC assembly 24 includes a catalyst operating window between upper and lower temperature thresholds, such as between approximately 400-510° C. The operating window represents a temperature where all of the $NH_3$ may be converted to $N_2$ and not oxidized to $NO_X$ (assuming the catalytic activity has not been deactivated).

The TWC assembly 22 includes an inlet 26 to receive the exhaust 20 from the engine 12 and an outlet 28 to discharge a fluid 30 (e.g., treated engine exhaust). The ASC assembly 24 includes an inlet 32 to receive the fluid 30 (e.g., including the treated engine exhaust and/or injected oxidant (e.g., air, $O_2$, oxygen-enriched air, or oxygen-reduced air)) and an outlet 34 to discharge an additionally treated fluid 36. A fluid conduit 38 is disposed between the TWC assembly 22 and the ASC assembly 24. Specifically, the fluid conduit 38 is coupled to the outlet 28 of the TWC assembly 22 and the inlet 32 of the ASC assembly 24, thus, coupling both assemblies 22, 24 to enable fluid communication between them. The fluid conduit 38 enables the flow or transfer of the fluid 30 from the TWC assembly 22 to the ASC assembly 24.

As depicted, an air or oxidant injection system 40 (e.g., passive mid-bed air injection system) is coupled to the fluid conduit 38. The air injection system 40 injects oxidant (e.g., air, $O_2$, oxygen-enriched air, or oxygen-reduced air) into the fluid 30 within the fluid conduit 38 at a point or location 42 downstream of the outlet 28 of the TWC assembly 22 and upstream of the inlet 32 of the ASC assembly 24. In certain embodiments, oxidant injection via the air injection system 40 may be actively driven via a pump or injector. In other embodiments, the air injection system 40 may occur via passive entrainment. For example, the air injection system 40 injects oxidant (e.g., air, $O_2$, oxygen-enriched air, or oxygen-reduced air) at a constant rate. The rate of injection may be determined empirically. The injection of oxidant (e.g., air, $O_2$, oxygen-enriched air, or oxygen-reduced air), via the air injection system 40, regulates (e.g., maintains) a temperature of the fluid 30 (e.g., including the treated engine exhaust and/or injected oxidant (e.g., air, $O_2$, oxygen-enriched air, or oxygen-reduced air)) entering the ASC assembly 24 within the catalyst operating window of the ASC assembly 24 (e.g., with regards to conversion of $NH_3$ to $N_2$). The injection of oxidant also reduces emissions within the fluid 30, 36 by reducing the $NH_3$ to $N_2$ and oxidizing CO to $CO_2$.

An air injection control unit 44 (e.g., processor-based controller) controls an amount of oxidant injected by the air injection system 40 to regulate (e.g., maintain) a temperature of the fluid 30 into the inlet 32 of the ASC assembly 24. By controlling the temperature of the fluid, the air injection control unit 44 keeps the temperature of the fluid 30 entering the inlet 32 of the ASC assembly 24 at a desired temperature within the catalyst operating window (e.g., within upper and lower temperature thresholds) of the ASC assembly 24 to minimize emission of $NO_X$ from the ASC assembly 24. By maintaining the temperature of the fluid 30 within the catalyst operating window (where all of the $NH_3$ may be converted to $N_2$), the presence of $NO_X$ in the fluid 36 exiting the ASC assembly 24 is utilized by the air injection control unit 40 to monitor the catalyst or catalytic activity of the ASC assembly 24 for deactivation (e.g., decrease in catalytic activity) and/or to recommend or indicate a need for corrective action (e.g., cleaning) on the ASC assembly 24.

The exhaust treatment system 10 includes a plurality of transducers or sensors 46 disposed throughout the system 10 to measure systems parameters (e.g., $O_2$ concentration in exhaust gases generated by the engine 12, emissions concentration (e.g., $NO_X$), etc.) and to provide feedback (e.g., via signals representative of the system parameters) to the air injection control unit 44 and/or the engine control unit 14. For example, one or more $O_2$ or λ sensors 48 may be disposed downstream of the engine 12 and upstream of the TWC assembly 22 and the ASC assembly 24. The one or more $O_2$ sensors 48 measure a concentration of $O_2$ in the exhaust gases generated by the engine 12 prior to treatment (e.g., via the catalytic activities of the TWC assembly 22 and the ASC assembly 24). The transducers 46 also include one or more $NO_X$ transducers 52 disposed adjacent or proximal (e.g., downstream of) the outlet 34 of the ASC assembly 24. The $NO_X$ transducer 52 measures an amount or level of $NO_X$ (e.g., in ppm) in the fluid 36.

Based at least on feedback from the one or more $O_2$ sensors 48, the injection control unit 44 may determine if the engine 12 whether the engine is operating under a desired rich fuel condition (e.g., has λ value of less than 1.0 such as approximately 0.999, 0.998, 0.997, 0.996, 0.995, 0.994, 0.993, 0.980, 0.970, 0.960, 0.950, or any other value less than 1.0). The λ value represents the ratio of the actual air-fuel ratio to stoichiometry for a given mixture. A λ value of 1.0 is at stoichiometry, while a λ value of greater than 1.0 represents a lean fuel condition and a λ value less than 1.0 represents a rich fuel condition. The air injection control unit 44 may determine or calculate a λ value for the exhaust gases generated by the engine 12 based on the concentration of $O_2$ (e.g., received from at least one $O_2$ sensor 48) and to compare the λ to a threshold or reference λ value (e.g., λ reference or $\lambda_{REF}$) to determine if the λ value is less than or equal to the $\lambda_{REF}$. The $\lambda_{REF}$ represents a rich fuel condition threshold. The $\lambda_{REF}$ is less than 1.0. For example, the $\lambda_{REF}$ may be approximately 0.999, 0.998, 0.997, 0.996, 0.995, 0.994, 0.993, 0.980, 0.970, 0.960, 0.950, or any other value less than 1.0. The $\lambda_{REF}$ may be empirically derived for the engine 12. If the λ value is less than or equal to the $\lambda_{REF}$, then the engine 12 is operating under a desired rich fuel condition. If the engine 12 is operating under the desired rich fuel condition, then the injection control unit 44 may determine whether the catalytic activity of the ASC assembly 24 has been deactivated based on feedback from the one or more $NO_X$ transducers 52. Also, in certain embodiments, if the engine 12 is not operating under the desired rich fuel condition, the air control unit 44 may cease injection of the oxidant via the oxidant injection system 40 into the fluid conduit 38.

In certain embodiments, based on feedback from the one or more $O_2$ sensors 48, the engine control unit 14 may determine a fuel operating condition for the engine 12. For example, the engine control unit 14 may calculate λ and determine whether the engine 12 is operating at stoichiometry, a rich fuel condition, or a lean fuel condition as described above. Based on determining the fuel operating condition, the operating parameters of the engine 12 may be adjusted. For example, the air-fuel ratio may be adjusted to change fuel operating condition to a desired fuel operating condition.

Based on feedback from the one or more $NO_X$ transducers 52, the air injection control unit 44 monitors for (e.g., diagnoses or detects) deactivation of the catalyst (e.g., catalytic activity) within the ASC assembly 24. For example, the air injection control unit 44 may compare the level (e.g., value) of $NO_X$ (e.g., nitrogen monoxide and nitrogen dioxide) obtained from the transducer 52 to a $NO_X$ threshold value to determine if deactivation of the catalyst of the ASC assembly 24 has occurred (e.g., if the level of measured $NO_X$ is greater than the $NO_X$ threshold value or reference value, $NO_{X\ REF}$). The $NO_X$ threshold value may be determined empirically. If the catalytic activity of the ASC assembly 24 is deactivated, the air injection control unit 44 may recommend or indicate a need for corrective action to rejuvenate the catalytic activity of the ASC assembly 24. For example, the corrective action may include cleaning (e.g., physical cleaning), chemical treatment, drying, and/or calcining. The air injection control unit 44 may provide a user-perceptible signal indicating the need for the corrective action. For example, a textual or visual indicator may be provided to a display of the control unit 44 or a display on remote device. Also, a visual (e.g., via a light emitting device such as an LED) or audible signal (e.g., via a speaker) may be provided on the control unit 44 or a remote device.

The air injection control unit 44 includes processing circuitry (e.g., processor 54) and memory circuitry (e.g., memory 56). The processor 54 may execute instructions to monitor system parameters (fuel operating condition (e.g., rich fuel condition), emissions levels (e.g., $NO_X$), etc.), regulate (e.g., maintain) the temperature of the fluid 30 entering the inlet 32 of the ASC assembly 24, and/or monitor the catalyst of the ASC assembly 24 for deactivation. These instructions may be encoded in programs or code stored in a tangible non-transitory computer-readable medium (e.g., an optical disc, solid state device, chip, firmware) such as the memory 56. The processor 54 may also access tables or values stored in the memory 56. For example, the memory 56 may store one or more $\lambda_{REF}$ values. The memory 56 may also store one or more $NO_X$ threshold values. The memory 56 may also store one or rates of injection of oxidant for the passive air injection system 40 (e.g., for the constant rate of injection). As depicted, the air injection control unit 44 is coupled to the engine control unit 14. In certain embodiments, the air control unit 44 and the engine control unit 14 may form a single control unit.

Figure 2:
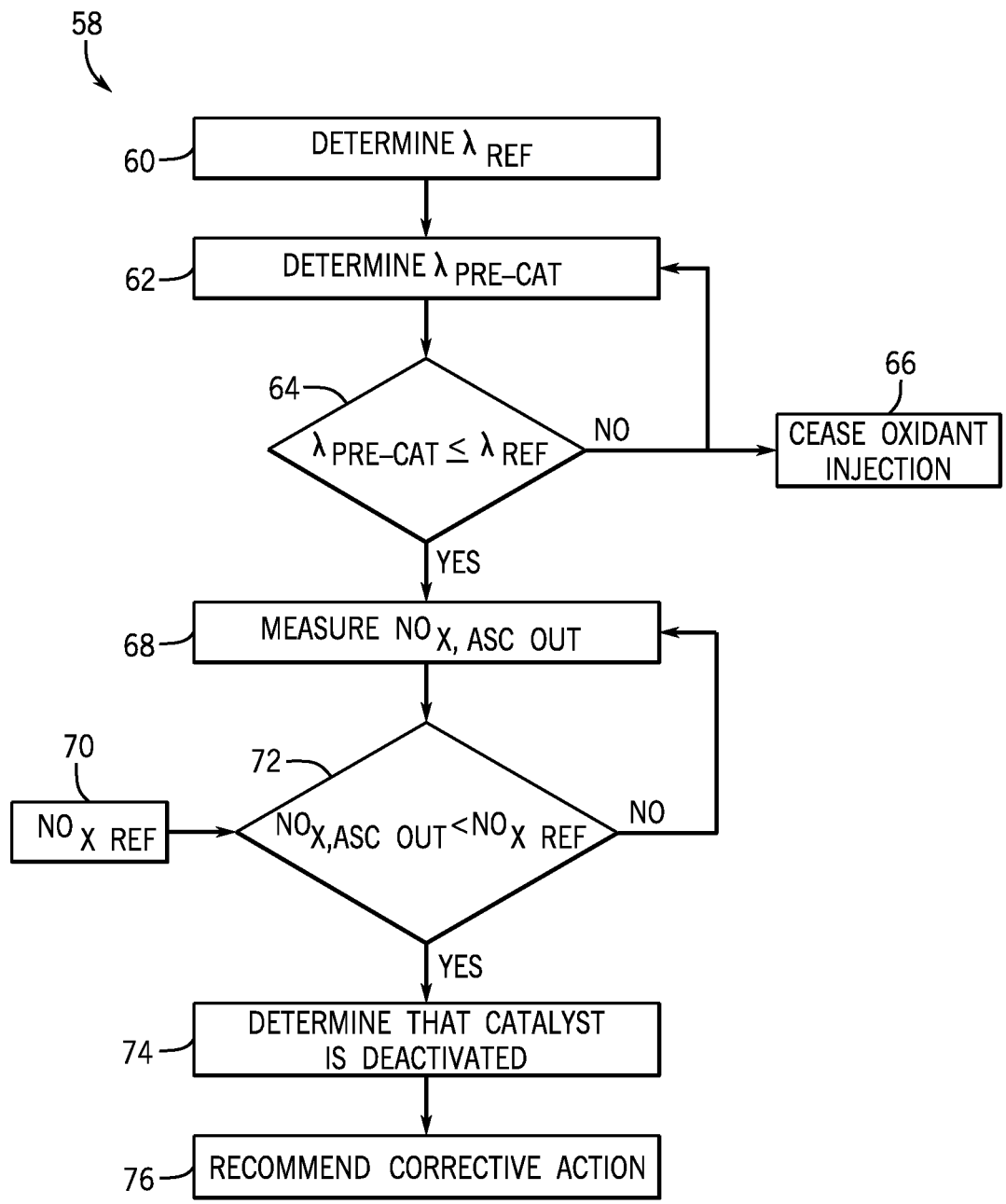
FIG. 2 is a flow chart of an embodiment of a computer-implemented method for determining a fuel operating condition and monitoring an ASC assembly for catalyst deactivation.

FIG. 2 is a flow chart of an embodiment of a computer-implemented method 58 for determining a fuel operating condition of the engine 12 and monitoring a catalyst assembly (e.g., ASC assembly) for catalyst deactivation. All or some of the steps of the method 58 may be executed by the air injection control unit 44 (e.g., utilizing the processor 18 to execute programs and access data stored on the memory 56). The method 58 includes determining $\lambda_{REF}$ for analyzing the exhaust gases from the engine 12 prior to treatment with any catalysts (e.g., the TWC assembly 22 and/or the ASC assembly 24) (block 60). In certain embodiments, the value for $\lambda_{REF}$ may be obtained from the air injection control unit 44 (e.g., memory 56) or the engine control unit 14 (e.g., memory 18). Alternatively, the $\lambda_{REF}$ may be inputted by a user. The $\lambda_{REF}$ represents a rich fuel condition threshold. The $\lambda_{REF}$ is less than 1.0. For example, the $\lambda_{REF}$ may be approximately 0.999, 0.998, 0.997, 0.996, 0.995, 0.994, 0.993, 0.980, 0.970, 0.960, 0.950, or any other value less than 1.0. The $\lambda_{PRE-CAT}$ may be empirically derived for the engine 12. The method 58 also includes determining the actual $\lambda$ value ($\lambda_{PRE-CAT}$) of the exhaust gases from the engine 12 prior to treatment with any catalysts (block 62). For example, the air injection control unit 44 may calculate $\lambda_{PRE-CAT}$ based on at least feedback from one or more $O_2$ sensors 48 as described above.

The method 58 further includes comparing $\lambda_{PRE-CAT}$ to $\lambda_{REF}$ to determine a fuel operating condition of the engine 12 (block 64). Specifically, the method 58 includes determining whether $\lambda_{PRE-CAT}$ is less than or equal to $\lambda_{REF}$. If $\lambda_{PRE-CAT}$ is not less than or equal to $\lambda_{REF}$, then the engine 12 is not operating under the desired fuel rich condition, and the method 58 includes ceasing oxidant injection (block 66) and continuing to determine $\lambda_{PRE-CAT}$ (block 62).

If $\lambda_{PRE-CAT}$ is less than or equal to $\lambda_{REF}$, the engine 12 is operating under the desired rich fuel condition. Then, the method 58 shifts to determining whether the catalytic activity of the ASC assembly 24 has been deactivated by first measuring the level of $NO_X$ ($NO_{X,\ ASC\ OUT}$), via one or more $NO_X$ sensors 52, in the fluid 36 (e.g., additionally treated exhaust gases) exiting the outlet 34 of the ASC assembly 24 (block 68). The method 58 determines if $NO_{X,\ ASC\ OUT}$ is greater than a $NO_X$ threshold value 70 ($NO_{X\ REF}$) (block 72). The $NO_X$ threshold value 70 may be obtained from the memory 56. Also, the $NO_X$ threshold value 70 may be inputted by a user. The $NO_X$ threshold value 70 may be empirically derived when initially setting up the ASC assembly 24. If $NO_{X,\ ASC\ OUT}$ is not greater than the $NO_X$ threshold value 70, the method 58 returns to measuring $NO_{X,\ ASC\ OUT}$ (block 68) and comparing $NO_{X,\ ASC\ OUT}$ to the $NO_X$ threshold value 70 (block 72). If $NO_{X,\ ASC\ OUT}$ is greater than the $NO_X$ threshold value 70, the method 58 determines that the catalytic activity or catalyst of the ASC assembly 24 is deactivated (block 74). Based on determining catalyst deactivation of the ASC assembly 24, the method 74 recommends or indicates a need for corrective action to rejuvenate (e.g., reactivate) the ASC assembly 24 (block 76). For example, the air injection control unit 44 causes a user perceptible signal (e.g., via a computer display) as described above to be provided to indicate the need for corrective action. Corrective actions may include cleaning (e.g., physical cleaning), chemical treatment, drying, and/or calcining.

Technical effects of the disclosed embodiments include providing computer implemented systems and methods for monitoring the fuel operating condition (e.g., for a desired rich fuel operating condition) of the engine, monitoring the deactivation of catalysts in catalytic converters (e.g., ASC assembly 24), and recommending corrective actions (e.g., cleaning) in response to detecting deactivated catalysts. In particular, embodiments include the exhaust treatment system 10 that includes at least one $O_2$ sensor 48 disposed upstream of TWC assembly 22 and the ASC assembly 24 that measures $O_2$ concentration in the exhaust gases generated by the engine 12 prior to catalytic treatment. Based on at least the feedback from the at least one $O_2$ sensor 48, the air injection control unit 44 may determine whether the engine 12 is operating at a desired rich fuel condition. The system 10 also includes at least one $NO_X$ transducer 52 downstream of the outlet 34 of the ASC assembly 24 to provide feedback to the air injection control unit 44 as to the level of $NO_X$ emissions in the fluid 36. If the engine 12 is operating at the desired rich fuel condition, based on the level of $NO_X$ emissions, the air injection control unit 44 can determine if the catalyst in the ASC assembly 24 has deactivated, and, if the catalyst has deactivated, the control unit 44 may recommend or indicate a need for corrective action to rejuvenate the catalytic activity of the ASC assembly 24. By diagnosing whether the catalyst of the ASC assembly 24 has deactivated, the catalytic activity of the ASC assembly 24 may be maximized and emissions reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an exhaust aftertreatment system configured to treat emissions from a combustion engine, wherein the exhaust aftertreatment system comprises:
a three-way catalyst (TWC) assembly having a first inlet;
an ammonia slip catalyst (ASC) assembly configured to receive treated exhaust gases from the TWC assembly and to convert ammonia ($NH_3$) within the treated exhaust gases into nitrogen ($N_2$), wherein the ASC assembly has a second inlet and an outlet;
at least one oxygen ($O_2$) sensor disposed upstream of the first inlet of the TWC assembly and configured to determine a concentration of $O_2$ in exhaust gases generated by the combustion engine;
at least one nitrogen oxides ($NO_x$) sensor disposed downstream of the outlet of the ASC assembly and configured to measure a concentration of NOx in the treated exhaust gases exiting the outlet of the ASC assembly; and
a controller comprising a memory encoding one or more processor-executable routines and a processor configured to access and execute the one or more routines encoded by the memory, wherein the routines, when executed cause the processor to receive a first signal from the at least one $NO_x$ sensor representative of the concentration of $NO_x$ in the treated exhaust gases exiting the outlet of the ASC assembly and a second signal from the at least one $O_2$ sensor representative of the concentration of $O_2$ in the exhaust gases generated by the combustion engine, and to determine whether the catalytic activity has been deactivated in the ASC assembly based at least in part on the received first and second signals or by determining if the concentration of $NO_x$ in the treated exhaust gases exiting the ASC assembly is greater than a $NO_x$ threshold value, and wherein the controller is configured to determine whether corrective action is needed to clean the ASC assembly to reactivate the catalytic activity if it is determined that the catalytic activity in the ASC assembly has been deactivated, and to cause a user perceptible signal to be provided indicating the need for corrective action.

2. The system of claim 1, wherein the exhaust aftertreatment system comprises a fluid conduit disposed between the TWC assembly and the ASC assembly and configured to transfer the treated exhaust gases from the TWC assembly to the ASC assembly.

3. The system of claim 2, wherein the exhaust aftertreatment system comprises an oxidant injection system coupled to the fluid conduit and configured to inject an oxidant at a constant rate into the fluid conduit to maintain a temperature of the treated exhaust gases flowing into the inlet of the ASC assembly and to reduce emissions in the treated exhaust gases.

4. The system of claim 1, wherein the controller is configured, prior to determining whether the catalytic activity in the first catalyst ASC assembly has been deactivated, to determine if the combustion engine is operating under a desired rich fuel condition and to subsequently determine whether the catalytic activity in the catalyst ASC assembly has been deactivated if the combustion engine is operating under the desired rich fuel condition.

5. The system of claim 4, wherein the controller is configured to determine an air-to-fuel equivalence ratio value for the exhaust gases generated by the combustion engine based on the concentration of $O_2$ in the exhaust gases and to determine if the combustion engine is operating under the desired rich fuel condition if the air-to-fuel equivalence ratio value is less than or equal to a threshold air-to-fuel equivalence ratio value.

6. The system of claim 1, comprising the combustion engine coupled to the exhaust aftertreatment system.

7. The system of claim 1, comprising a display, wherein the controller is configured to cause user perceptible signal to be provided on the display.

8. A system, comprising:
a controller comprising a memory encoding one or more processor-executable routines and a processor configured to access and execute the one or more routines encoded by the memory, wherein the routines, when executed cause the processor to determine if a combustion engine is operating under a desired rich fuel condition, and, if the combustion engine is operating under the desired rich fuel condition, to monitor a catalytic activity within an ammonia slip catalyst (ASC) assembly disposed downstream of a three-way (TWC) catalyst that converts ($NH_3$) within treated exhaust gases from the TWC catalyst into nitrogen ($N_2$) to determine whether the catalytic activity has been deactivated in the ASC assembly, and wherein the controller is configured to determine whether corrective action is needed to clean the ASC assembly to reactivate the catalytic activity if it is determined that that the catalytic activity in the ASC assembly has been deactivated and to cause a user perceptible signal to be provided indicating the need for corrective action.

9. The system of claim 8, wherein the controller is configured to receive a first signal from at least one oxygen ($O_2$) sensor disposed upstream of an inlet of the ASC assembly, wherein the first signal is representative of a concentration of $O_2$ in exhaust gases generated by the combustion engine.

10. The system of claim 9, wherein the controller is configured to determine the fuel condition the combustion engine is operating under by determining an air-to-fuel equivalence ratio value for the exhaust gases generated by the combustion engine based on the concentration of $O_2$ in the exhaust gases and to determine if combustion engine is operating under the desired rich fuel condition by determining if the air-to-fuel equivalence ratio value is less than or equal to a threshold air-to-fuel equivalence ratio value.

11. The system of claim 9, wherein the controller is configured to receive a second signal from at least one nitrogen oxides ($NO_X$) sensor disposed downstream of an outlet of the ASC assembly, wherein the second signal is representative of a concentration of $NO_X$ in the treated exhaust gases exiting the outlet of the ASC assembly.

12. The system of claim 11, wherein the controller is configured to determine whether the catalytic activity in the ASC assembly has been deactivated by determining if the concentration of $NO_X$ in the treated exhaust gases is greater than a $NO_X$ threshold value.

13. The system of claim 8, comprising an exhaust aftertreatment system having the controller, wherein the exhaust aftertreatment system comprises the ASC assembly and an oxidant injection system coupled to a fluid conduit upstream of an inlet to the ASC assembly and configured to inject an oxidant at a constant rate into the fluid conduit to maintain a temperature of the treated exhaust gases flowing into the inlet of the ASC assembly and to reduce emissions in the treated exhaust gases.

14. The system of claim 8, comprising a display, wherein the controller is configured to cause the user perceptible signal to be provided on the display.

15. A system, comprising:
an exhaust aftertreatment system configured to treat emissions from a combustion engine, wherein the exhaust aftertreatment system comprises:
a three-way catalyst (TWC) assembly having a first inlet;
an ammonia slip catalyst (ASC) assembly configured to receive treated exhaust gases from the TWC assembly and to convert ammonia ($NH_3$) within the treated exhaust gases into nitrogen ($N_2$), wherein the ASC assembly has a second inlet and an outlet;
at least one oxygen ($O_2$) sensor disposed upstream of the first inlet of the TWC assembly and configured to determine a concentration of $O_2$ in exhaust gases generated by the combustion engine;
at least one nitrogen oxides ($NO_x$) sensor disposed downstream of the outlet of the ASC assembly and configured to measure a concentration of $NO_x$ in the treated exhaust gases exiting the outlet of the ASC assembly; and
a controller comprising a memory encoding one or more processor-executable routines and a processor configured to access and execute the one or more routines encoded by the memory, wherein the routines, when executed cause the processor to determine if the combustion engine is operating under a desired rich fuel condition based on the concentration of $O_2$ in the exhaust gases, and, if the combustion engine is operating under the desired rich fuel condition, utilizing the measured concentration of $NO_x$ in the treated exhaust gases exiting the outlet of the ASC assembly to monitor the catalytic activity within the ASC assembly that converts $NH_3$ within the treated exhaust gases into $N_2$ to determine whether the catalytic activity has been deactivated in the ASC assembly, and wherein the controller is configured to determine whether corrective action is needed to clean the ASC assembly to reactivate the catalytic activity if it is determined that that the catalytic activity in the ASC assembly has been deactivated and to cause a user perceptible signal to be provided indicating the need for corrective action.

16. The system of claim 15, comprising a display, wherein the controller is configured to cause the user perceptible signal to be provided on the display.

* * * * *

UNITED STATES PATENT AND TRADEMARK OFFICE
CERTIFICATE OF CORRECTION

| | |
|---|---|
| PATENT NO. | : 9,228,469 B2 |
| APPLICATION NO. | : 14/252890 |
| DATED | : January 5, 2016 |
| INVENTOR(S) | : Devarakonda |

It is certified that error appears in the above-identified patent and that said Letters Patent is hereby corrected as shown below:

On the Title Page, in item (54), in Title, in Column 1, Line 1, delete "AFTERTREATEMENT" and insert -- AFTERTREATMENT --, therefor.

In the Specification

In Column 1, Line 1, delete "AFTERTREATEMENT" and insert -- AFTERTREATMENT --, therefor.

In the Claims

In Column 9, Line 62, in Claim 4, delete "first catalyst ASC" and insert -- ASC --, therefor.

In Column 9, Line 65, in Claim 4, delete "catalyst ASC" and insert -- ASC --, therefor.

In Column 10, Line 30, in Claim 8, delete "that that" and insert -- that --, therefor.

In Column 12, Line 17, in Claim 15, delete "that that" and insert -- that --, therefor.

Signed and Sealed this
Twenty-third Day of August, 2016

Michelle K. Lee
*Director of the United States Patent and Trademark Office*